(12) United States Patent
Zagnoni et al.

(10) Patent No.: US 12,492,078 B2
(45) Date of Patent: Dec. 9, 2025

(54) CARRIAGE FOR TRANSPORT SYSTEMS AND TRANSPORT SYSTEM

(71) Applicant: PLUSLINE S.R.L., Zola Predosa (IT)

(72) Inventors: Christian Zagnoni, Calcara Valsamoggia (IT); Leonardo Stamati, Bologna (IT)

(73) Assignee: PLUSLINE S.R.L., Zola Predosa (IT)

( * ) Notice: Subject to any disclaimer, the term of this patent is extended or adjusted under 35 U.S.C. 154(b) by 107 days.

(21) Appl. No.: 18/567,441

(22) PCT Filed: Jun. 27, 2022

(86) PCT No.: PCT/IT2022/050184
§ 371 (c)(1),
(2) Date: Dec. 6, 2023

(87) PCT Pub. No.: WO2023/286092
PCT Pub. Date: Jan. 19, 2023

(65) Prior Publication Data
US 2024/0270499 A1    Aug. 15, 2024

(30) Foreign Application Priority Data
Jul. 13, 2021   (IT) .................. 102021000018473

(51) Int. Cl.
*B65G 17/00*      (2006.01)
*B65G 54/02*      (2006.01)

(52) U.S. Cl.
CPC ........... *B65G 17/005* (2013.01); *B65G 54/02* (2013.01)

(58) Field of Classification Search
CPC .............................. B65G 54/02; B65G 17/005
See application file for complete search history.

(56) References Cited

U.S. PATENT DOCUMENTS

| | | | | |
|---|---|---|---|---|
| 3,139,175 | A * | 6/1964 | Wells | B65G 17/42 198/686 |
| 4,210,238 | A * | 7/1980 | Frost | B65G 17/385 105/154 |
| 4,484,525 | A * | 11/1984 | Forshee | B65G 9/002 105/154 |
| 6,241,082 | B1 * | 6/2001 | Vanmeenen | B65G 17/20 198/845 |
| 10,974,914 | B2 * | 4/2021 | Kleinikkink | H02K 41/02 |
| 11,091,322 | B2 * | 8/2021 | Monti | B65G 39/20 |
| 2010/0034631 | A1 * | 2/2010 | Klaiber | B65G 9/002 414/800 |
| 2017/0174435 | A1 * | 6/2017 | Fenile | B65G 19/025 |
| 2021/0384765 | A1 * | 12/2021 | Das | H02J 50/12 |

* cited by examiner

*Primary Examiner* — Mark A Deuble
(74) *Attorney, Agent, or Firm* — Rivka Friedman

(57) ABSTRACT

Carriage for transport systems, comprising a frame (1) on which a plurality of wheels (2A, 2B, 2C; 2D) configured to run on two opposite sides (31, 32) of a guide (3) are mounted. The frame (1) is in two parts (10, 11) on each of which a predetermined number of said wheels (2A, 2B, 2C; 2D) are mounted in respective fixed and predetermined positions. The carriage comprises tightening means (4) for tightening said parts (10, 11). The parts (10, 11) of the frame (1) have respective mating surfaces (101, 111) which are pushed against each other by the tightening means (4). On each of said parts (10, 11) of the frame (1) the wheels are mounted by means of respective fixed pins (PA, PB, PC; PD) protruding from corresponding mounting surfaces (100, 110) orthogonal to the mating surfaces (101, 111).

12 Claims, 4 Drawing Sheets

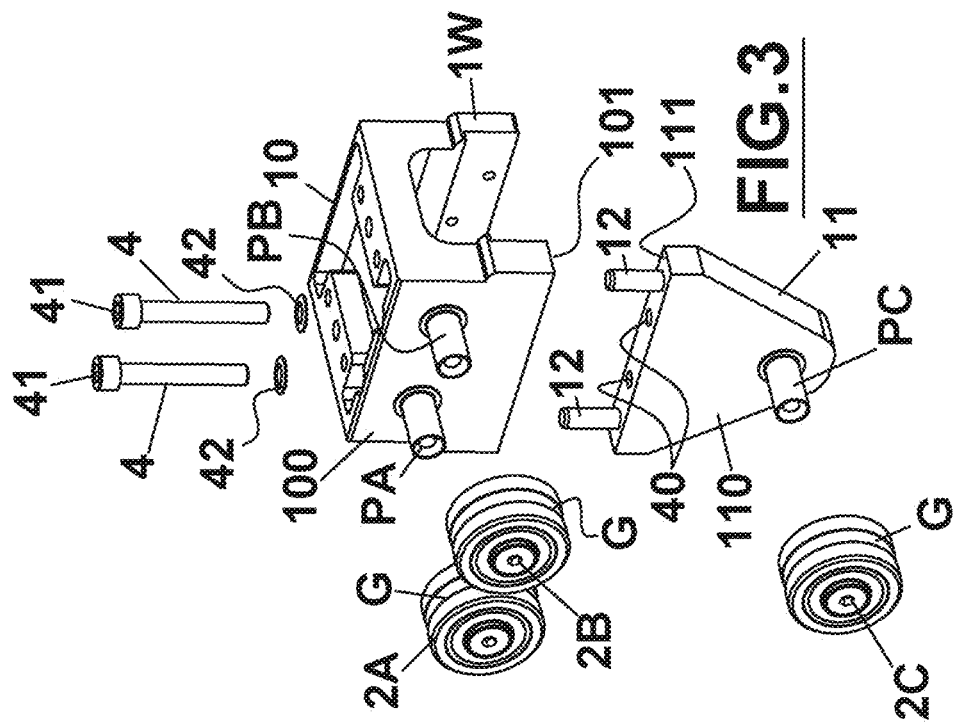
FIG.3
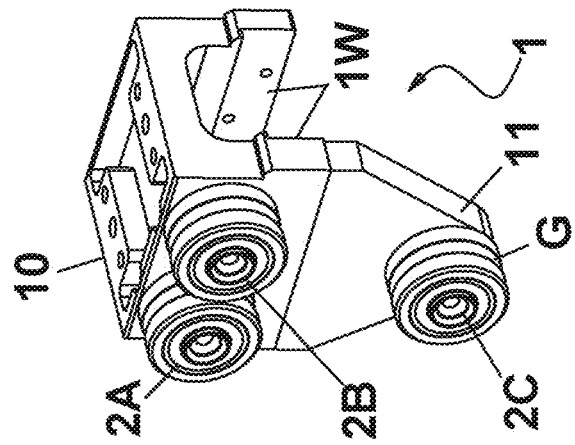
FIG.2
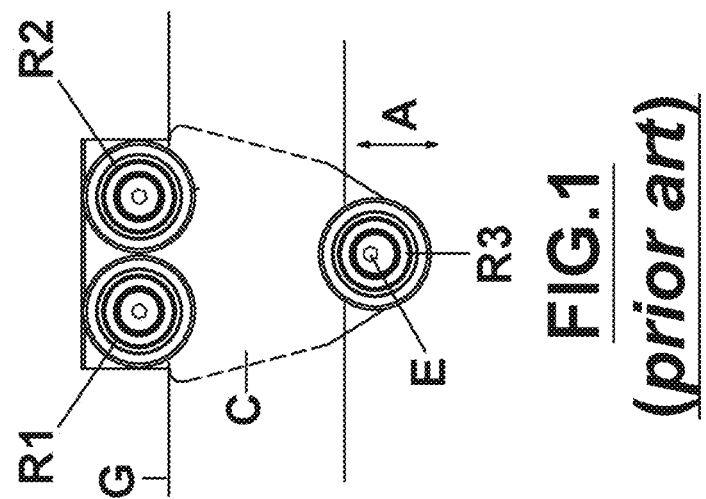
FIG.1 *(prior art)*

CARRIAGE FOR TRANSPORT SYSTEMS AND TRANSPORT SYSTEM

The present invention relates to a carriage for transport systems and a transport system equipped with a plurality of carriages.

More particularly, a carriage according to the present invention is of the type usable for making transport systems in which one or more carriages are guided along a path of predefined shape which crosses a series of operating stations of a machine or a production plant.

So-called "linear" transport systems are known, in which several carriages are moved independently from one another along a guide of predefined shape by means of linear motors. Typically, as shown in FIG. 1 of the attached drawings, the carriages (C) are constrained to the guide (G) by means of three wheels (R1, R2, R3) whose rotation axes form a triangular arrangement, with two wheels (R1, R2) positioned on one side of the guide and the third wheel (R3) positioned on the opposite side. In order to ensure correct movement of the carriages by the linear motors, it is necessary that the rollers (R1, R2, R3) exert a predetermined pressure on the guide, in jargon called "preload". For this reason, since the axes of the first two wheels are fixed, the third wheel is linked to the carriage (C) by means of an adjustment mechanism with an eccentric pin (E) whose position is adjusted, as indicated by the arrow "A", using a flat wrench to be inserted in a small space between the wheel and the frame of the carriage. This operation requires a certain degree of experience to the operators who perform it, not being an operation generally assisted by adequate measuring instruments. In addition, there is the fact that generally a transport system of this type can comprise dozen carriages, each of which must be adequately adjusted. A further drawback of the known transport systems derives from the frequent loss of the adjustment previously performed, due to the intrinsic instability of the connection of the third roller by means of the aforesaid eccentric connection.

The main object of the present invention is to eliminate, or at least drastically reduce, the aforementioned drawbacks.

This result has been achieved, in accordance with the present invention, by adopting the idea of providing a carriage for transport systems having the characteristics indicated in claim 1. Other characteristics of the present invention are the subject of the dependent claims.

Thanks to the present invention, it is possible to realize transport systems in which the carriages can be fastened to the guide in a simple and relatively fast way, given the absence of adjustments required when associating the carriages to the guide, which allows this operation to be entrusted also to personnel not particularly trained, both during the assembly and maintenance of the transport system.

These and further advantages and characteristics of the present invention will be better understood by every person skilled in the art thanks to the following description and the attached drawings, provided by way of example but not to be considered in a limiting sense, in which:

FIG. 1 is a diagram relating to a carriage for transport systems of the known type;

FIG. 2 represents a perspective view of a carriage according to the present invention;

FIG. 3 represents an exploded view of the carriage of FIG. 2;

Reduced to its essential structure and with reference to FIGS. 2-6 of the attached drawings, a carriage for transport systems according to the present invention comprises a frame (1) on which more wheels (2A, 2B, 2C) are mounted, configured to be able to run on a guide (3) developed along a predefined guide path. Preferably, the guide (3) has an internal edge and an external edge with a "V"-shaped cross section on which slide the wheels (2A, 2B, 2C) that, for this purpose, have each a circumferential sliding groove (G) on their external surface. Preferably, said wheels are three in number and the respective axes are arranged according to a triangular configuration on a same side of the frame (3).

Figure 4:
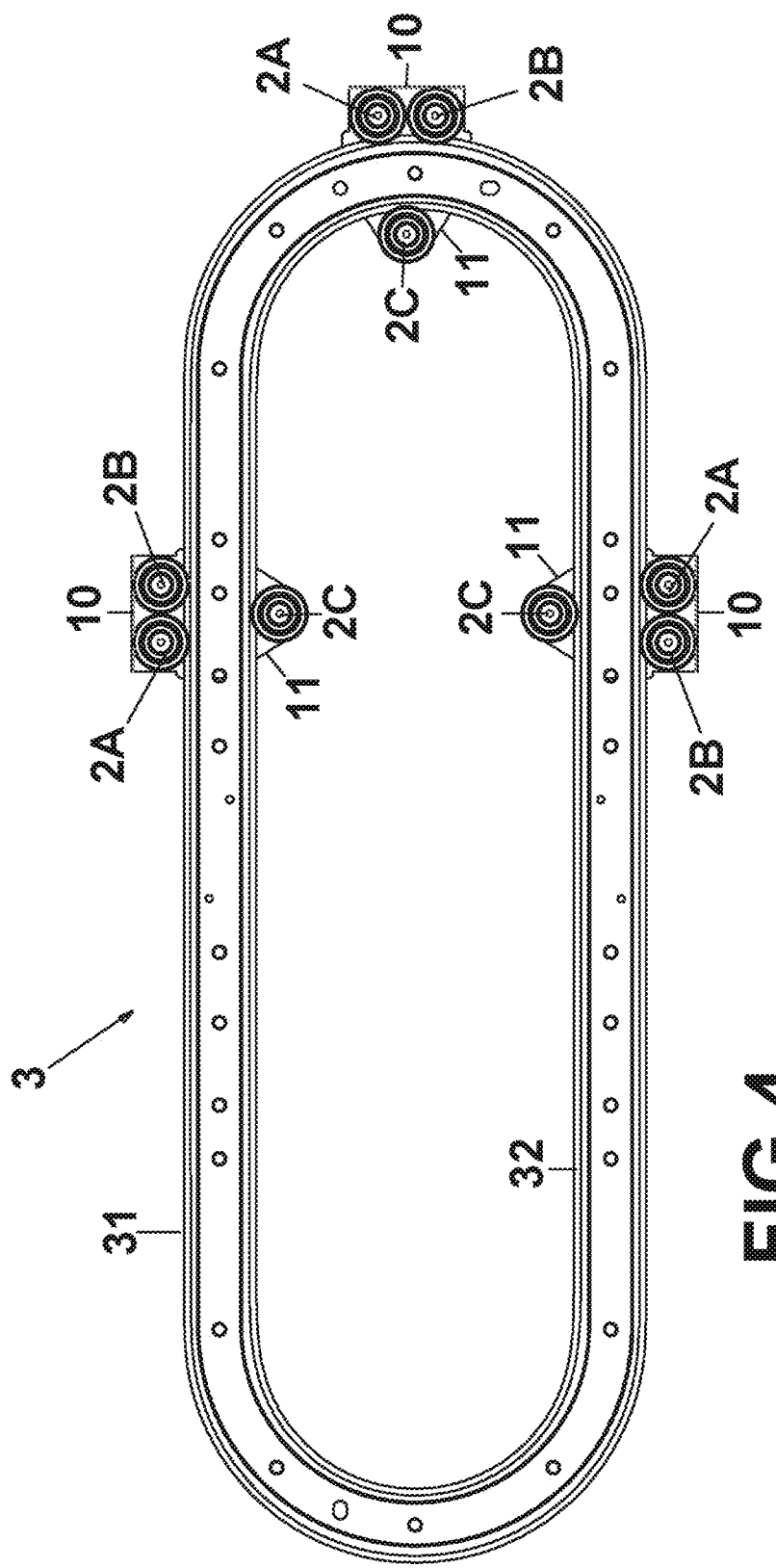
FIG. 4 shows a guide on which several carriages are mounted according to the present invention.

When the carriage is used, it has two wheels (2A, 2B) on one side of the guide (3) and a wheel (2C) on the opposite side. For example, the guide (3) comprises two straight sections parallel to each other, connected by two curved sections, as shown in the example of FIG. 4. In this example, two wheels (2A, 2B) are external, being intended to run on the outer edge (31) of the guide (3) and the third roller (2C) is internal, being intended to run on the inner edge (32) of the same guide Advantageously, in accordance with the present invention, the frame (1) is in two parts (10, 11) mutually connected by tightening means adapted to tighten these parts against each other with a predefined tightening pressure. Since, when the carriage is in use, one part (10) of the frame (1) is external to the external edge (31) of the guide (3) and the other part (11) is internal to the internal edge (32) of the guide (3), in the rest of this description the parts (10, 11) of the frame (1) may also be referred to as the external part (10) and the internal part (11). Each of said parts (10, 11) of the frame (1) supports a predetermined number of said wheels in fixed and predetermined positions. With reference to the example shown in FIGS. 2-6, the external wheels (2A, 2B) are applied on the external part (10) of the frame (1) and the internal wheel (2C) is on the internal part (11).

The wheels (2A, 2B, 2C) are mounted on respective pins (PA, PB, PC) formed in fixed and predetermined positions on said parts (10, 11) of the frame (1). The pins (PA, PB, PC) define the rotation axes of the wheels (2A, 2B, 2C) and are parallel to each other and oriented orthogonally to a face (100, 110) where the wheels are mounted on the parts (10, 11) of the frame (1).

The parts (10, 11) of the frame (1) have respective counter-facing mating edges (101, 111) intended to be tightened against each other by the tightening means. In accordance with the example shown in the accompanying drawings, the counter-facing mating edges (101, 111) are formed by surfaces that are orthogonal to the surfaces (100, 110) of the parts (10, 11) from which the pins (PA, PB, PC) protrude.

For example, said tightening means are screw means.

With reference to the example shown in FIG. 3, the tightening means consist of two screws (4) oriented orthogonally to the counter-facing edges (101, 111) of the parts (10, 11) and inserted in corresponding threaded holes (40) formed on the latter. Preferably, the heads (41) of the screws (4) are on the part (10) of the frame (1) on which the external wheels (2A, 2B) are mounted. Under the head (41) of each screw (4) there is a ring or similar anti-unscrewing device (42).

Preferably, on the edge (111) of the part (11) on which the internal roller (2C) is mounted, two mounting pins (12) are formed, oriented parallel to the holes (40) in which the screws (4) are inserted. In other words, the mounting pins (12) are oriented orthogonally to the mating edges (101, 111). The mounting pins (12) are preferably arranged laterally to said holes (40), so that the screws (4) are internal to the mounting pins (12).

In practice, the frame (1) is a clamp in which the jaws consist of two parts (10, 11) that can be positioned on opposite sides with respect to the guide (3), wherein each of said parts (10, 11) has elements (2A, 2B, 2C) for their fastening to a respective side of the guide (3), and tightening means are provided for tightening said parts (10, 11) against each other, so that there is no clearance between said fastening elements (2A, 2B, 2C) and the respective edges (31, 32) of the guide (3).

The tightening of the parts (10, 11) of the frame (1) on the two edges (31, 32) of the guide (3), ensures a pressure between each fastening element (2A, 2B, 2C) and the respective side of the (31, 32) of the guide (3) which corresponds to the desired preload that prevents the free running of the carriage on the guide and imposes the application of a force of a predetermined value to allow the carriage to be moved.

From the foregoing description the simplicity of mounting the carriage on the guide is evident, since the need to adjust the position of the internal roller which is in a fixed position is avoided. This advantage is even more evident considering that, generally, a transport system comprises a large number of carriages which not only must be mounted on the guide during the construction of the transport system but can also be subject to replacement due to wear of the wheels or, more in general, must be disassembled for ordinary or extraordinary maintenance of the system.

Preferably, the guide (3) is a single metal piece machined from solid. This construction of the guide (3) eliminates the typical drawbacks of modular guides, made by joining modules abutting one behind the other, including the noise and vibrations generated by the carriages running on the modules that are not always correctly aligned. It goes without saying that the realization of the guide (3) in a single piece is of the customized type, in the sense that its geometry will depend on the specific application for which the guide is intended.

Figure 6:
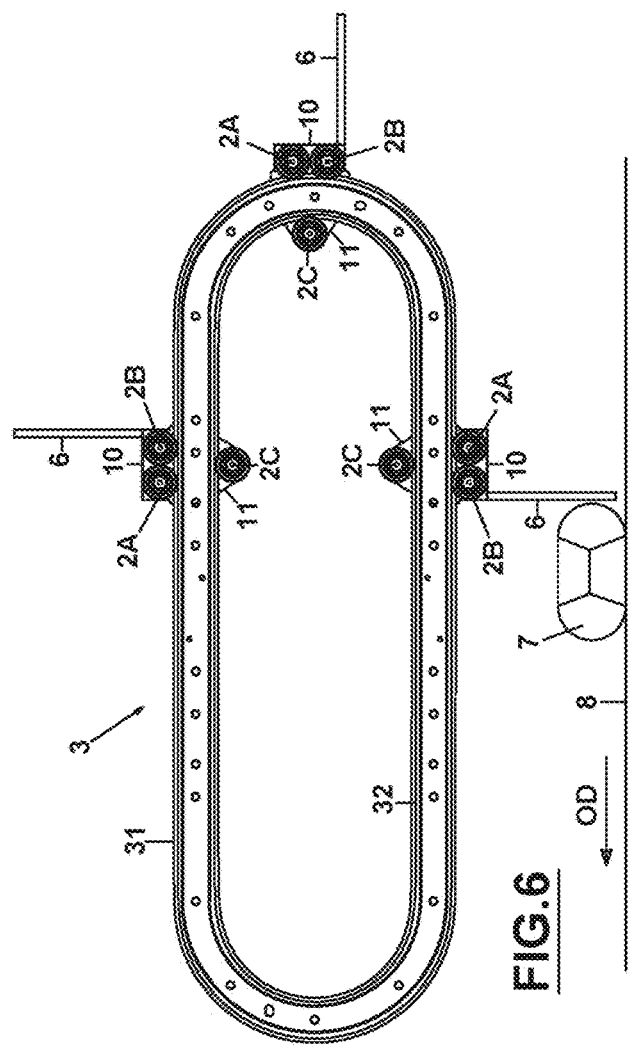
FIG. 6 represents a further example of use of a transport system provided with carriages made in accordance with the present invention.
Figure 5:
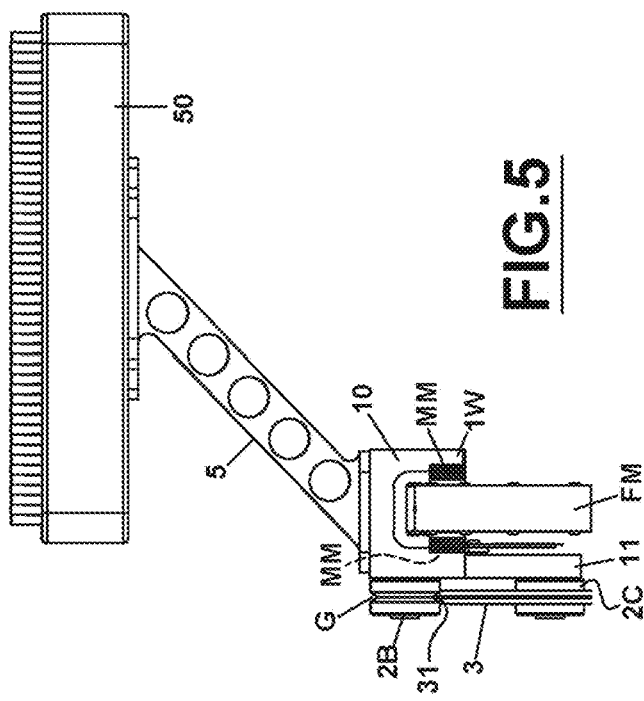
FIG. 5 represents an example of use of a transport system provided with carriages made in accordance with the present invention.

For example, the transport system can be of the type having linear motors, in which, according to a principle known per se to those skilled in the art, the movement of the carriages is determined by the interaction between fixed magnetic components arranged along a path corresponding to that defined by the guide (3) and magnetic components integral with the carriages. For this purpose, the part (10) of the frame (1) on which the external wheels (2A, 2B) are mounted can be shaped in such a way as to exhibit a "C"-shaped side profile, with two opposite wings (1W) on which respective magnetic components can be attached. According to the example shown in FIG. 5, the reference "FM" indicates a fixed magnetic component of the linear motor system, while the reference "MM" indicates the magnetic components fixed on the opposite wings of the part (10). In this example, on an external side of the part (10) of the frame (1) an arm (5) is applied which supports a brush (50) intended to be moved along a path defined by the shape of the guide (3). It goes without saying that, more generally, any object that has to be moved along a path defined by a guide on which said wheels slide can be applied to the carriage. For example, as schematically shown in FIG. 6, on the part (10) of the frame (1) a pusher (6) can be mounted to push an object (7) along a surface (8) of a machine in which the object (7) is subjected to predefined operations. For example, the object (7) can be constituted by a group of paper rolls to be packaged which is moved along an operating direction of treatment "OD" on the surface (8). Again, for example, a piece-carrying shuttle (not shown in the drawings) can be mounted on the part (10) of the frame (1).

The guide (3) can be oriented both vertically and horizontally, i.e. the path defined by the shape of the guide (3) can develop both on a vertical and a horizontal plane. In any case, it is understood that the guide (3) can be oriented in any way in the space according to the specific application or use of the transport system.

Figure 8:
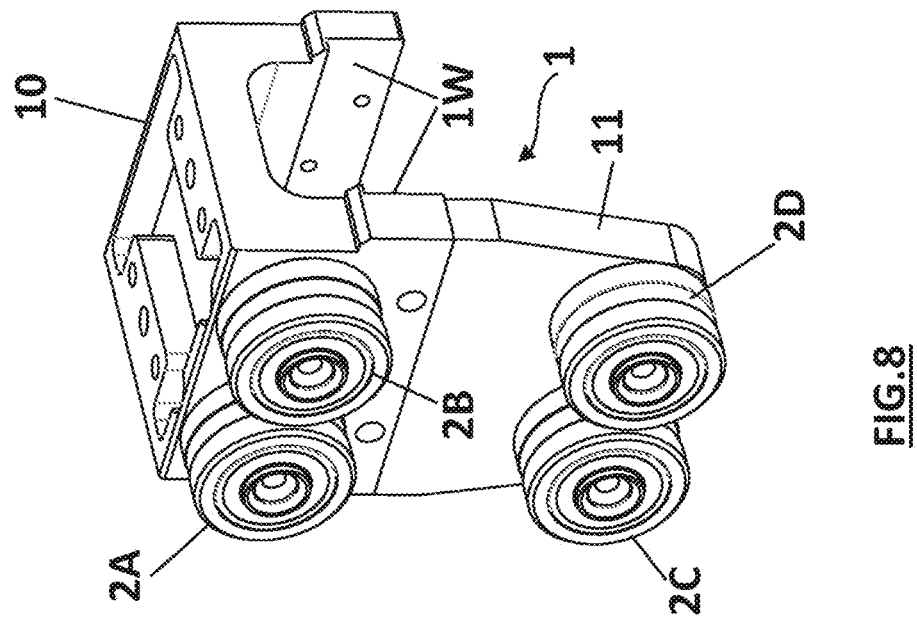
FIGS. 7 and 8 are similar to FIGS. 2-3 but they relate to a further example of embodiment of a carriage according to the present invention.
Figure 7:
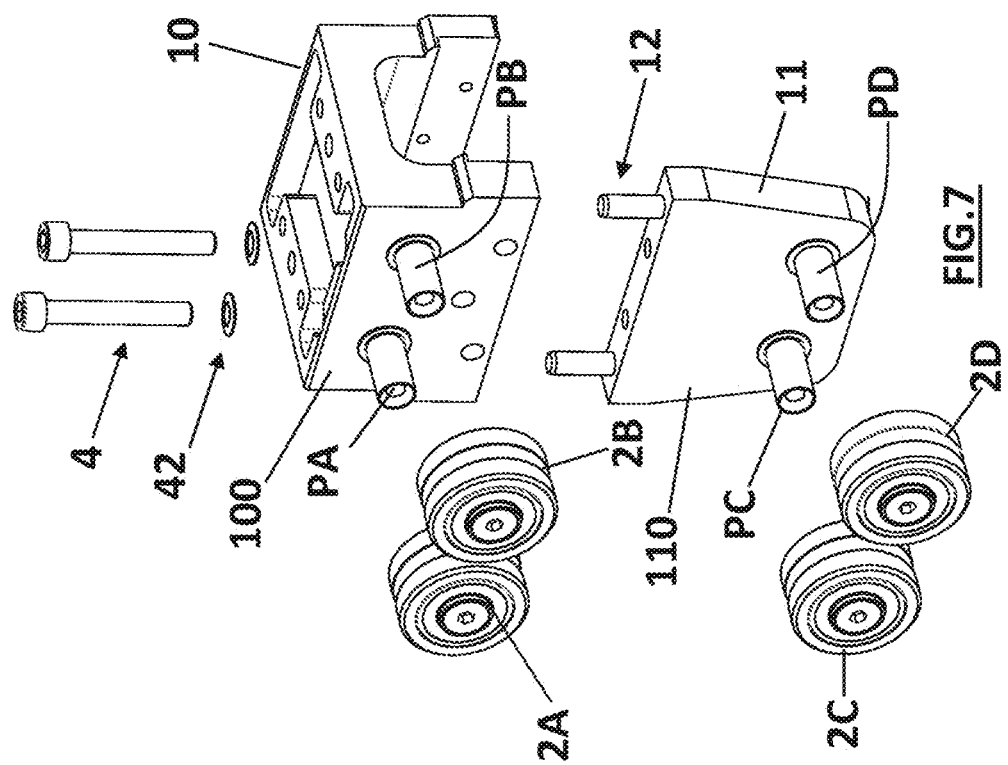

In accordance with the example shown in FIGS. 7 and 8, the carriage is provided with four wheels (2A, 2B, 2C, 2D) mounted on respective fixed pins (PA, PB, PC, PD) which, as in the example of FIGS. 2-6, protrude from the mounting surfaces (100, 110) orthogonal to the mating surfaces (101, 111).

Preferably, the pins (PA, PB, PC; PD) on which the wheels are mounted form a single body with said mounting surfaces (100, 110). For example, said parts (10, 11) of the frame (1) are machined from solid so that the pins (PA, PB, PC; PD), and possibly the pins (12), are made from the same metal block which forms the parts (10, 11).

In practice, the details of execution can in any case vary in an equivalent way as regards the individual elements described and illustrated, without thereby departing from the scope of the solution adopted and therefore remaining within the limits of the protection granted by this patent in accordance with the following claims.

The invention claimed is:

1. A carriage for transport systems, comprising a frame (1) on which a plurality of wheels (2A, 2B, 2C; 2D) configured to run on two opposite sides (31, 32) of a guide (3), wherein the frame (1) has two frame parts (10, 11) on each of which a predetermined number of wheels (2A, 2B, 2C; 2D) is mounted in respective fixed and predetermined wheels positions, the frame further comprising tightening means (4) for tightening the frame parts (10, 11) to each other, the frame parts (10, 11) having respective mating surfaces (101, 111) which are pushed against each other by the tightening means (4), the tightening means providing tightening of the frame parts along a tightening direction oriented orthogonally to the mating surfaces, the wheels being mounted on the frame parts by means of respective fixed pins (PA, PB, PC; PD) protruding from wheels mounting surfaces (100, 110) provided by the frame parts, the wheels mounting surfaces being orthogonal to the mating surfaces (101, 111), such that the tightening direction is orthogonal to the fixed pins.

2. The carriage according to claim 1 wherein the wheels are all mounted on a same side of the frame (1).

3. The carriage according to claim 1 wherein the wheels are all mounted on a same side of the frame (1), the wheels being three in number, with two wheels (2A, 2B) mounted on one frame part (10) and one wheel (2C) mounted on the other frame part (11).

4. The carriage according to claim 1 wherein the wheels are all mounted on a same side of the frame (1), the wheels being four in number, with two wheels (2A, 2B) mounted on one frame part (10) and two wheels (2C, 2D) mounted on the other frame part (11).

5. The carriage according to claim 1 wherein the wheels each have a circumferential groove (G) on an external surface of the wheels.

6. The carriage according to claim 1 wherein the tightening means (4) are screw tightening means.

7. The carriage according to claim 1 wherein said the tightening means (4) comprise a plurality of screws passing orthogonally through said mating surfaces (101, 111).

8. The carriage according to claim 1 further comprising mounting pins (12) oriented orthogonally to the mating surfaces (101, 111).

9. A transport system, comprising a predetermined number of carriages and a guide (3) along which the carriages move, wherein the carriages are made according to claim 1.

10. The transport system according to claim 9 wherein the guide (3) is monolithic.

11. The transport system according to claim 9 wherein the carriages are driven by linear motors.

12. The transport system according to claim 9 wherein the carriages are mounted without clearance on the guide (3).

* * * * *